DIGIT ABSORBING SELECTOR CIRCUIT
Filed April 24, 1956
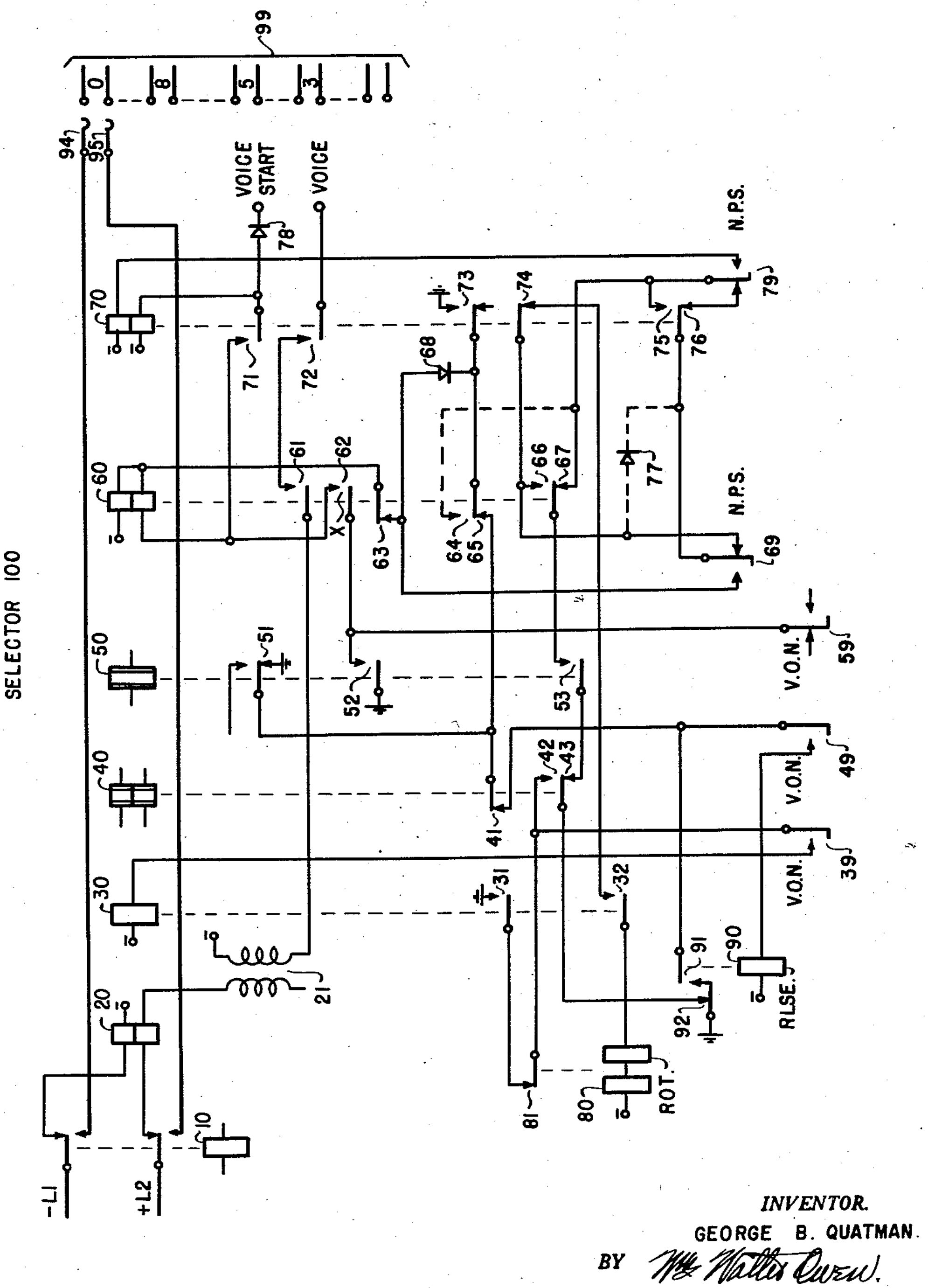
INVENTOR.
GEORGE B. QUATMAN
BY Wm. Walter Owen.
ATTY.

United States Patent Office 2,859,281

Patented Nov. 4, 1958

2,859,281

DIGIT ABSORBING SELECTOR CIRCUIT

George B. Quatman, Lima, Ohio, assignor to General Telephone Laboratories, Incorporated, a corporation of Delaware Application April 24, 1956, Serial No. 580,388

7 Claims. (Cl. 179—18)

This invention relates to telephone systems and more particularly to selector switches with digit absorbing features to be incorporated in the switching equipment of automatic telephone systems.

The objects of this invention are to provide a selector switch which may be simply adapted to a multitude of applications and provide faster, more efficient switching service in telephone systems having uniform numbering plans.

It is known that in an automatic telephone system where uniform numbering plans are desirable it is necessary to absorb one or more digits of certain called numbers to accomplish local switching. This has been done by the use of a vertical bank contact or normal post springs mounted on a two-motion step-by-step selector switch to effectuate a release of the shaft and wipers after completion of the vertical motion corresponding to a series of pulses. Circuit provisions have also been developed to absorb certain combinations of digits and subsequently allow trunk hunting on all levels. If an improper sequence is dialled many switches step to the eleventh rotary position subsequent to vertical motion; release the shaft and wipers to normal; and return a signal to the calling party.

This invention is a new and improved two-motion step-by-step selector switch arranged with two normal post springs each independently operable on any or all levels which will (*a*) trunk hunt automatically after receipt of the first digit, (*b*) absorb one or more digits once only and trunk hunt on all levels after receipt of the next digit, (*c*) repeatedly absorb one or more digits, (*d*) prevent rotary access of one or more levels and immediately return a tone or voice signal to a calling party if an improper sequence of digits is dialled but allow such levels to be accessed if a second digit is preceded by the proper first digit, and (*e*) prevent rotary access to one or more levels and immediately return tone or voice to the calling party if such a level is dialled. This is an alternate condition with that of (*d*) when there are vacant or restricted levels on the switch bank and requires the use of additional wiring. Under no circumstances can these levels be accessed regardless of any combination of digits that precede a second predetermined digit corresponding to the restricted level.

The schematic drawing presents the portion of the circuit relevant to my invention. Lines L1 and L2 connect the substation of the calling subscriber, associated line equipment and any preceding switching equipment not shown to selector 100 and terminate at the set of wipers 94 and 95. The wipers have access to any of the ten levels in the switch bank assembly 99 and step vertically and rotary with the switch shaft in a well-known manner. The levels are numbered to correspond to digits of the subscriber's dial and may be connected to a variety of succeeding equipment depending on the desired results. For purposes of this example the terminals on levels 3 and 5 are connected to another selector or connector. The terminals on level 8 may be connected to outgoing trunks to other dial offices or if the additional wiring is used level 8 may either be connected to restricted lines or remain vacant. The terminals on level 0 are connected to a manual operator. A complete description of two-motion step-by-step switches and their operation as selectors may be found on pages 53 to 65 of "Automatic Telephony," 2nd edition, by Smith and Campbell.

The selector 100 is similar to any of the well-known types described in "Automatic Telephony" and contains two normal post springs 69 and 79, in addition to the vertical stepping magnet, not shown, rotary stepping magnet 80, release magnet 90, vertical off-normal springs 39, 49, 59, and eleventh rotary position cam springs, not shown. Two normal post control relays 60 and 70 are added to the relays normally associated with a selector switch, such as the line relay 20, release relay 50, changeover relay 40, rotary stepping relay 30, and switch through relay 10. The wiring indicated by broken lines from contact 64 to contact 67 and from rectifier 77 is to be used only when rotary access to a level is to be prevented under all conditions.

The normal post springs 69 and 79 are independently actuated in a well-known manner on any or all levels by adjustment of the normal post lugs similar to the arrangement shown in Patent No. 1,888,700 granted to Hans Sengebusch on November 22, 1932.

The seizure and vertical stepping of the selector 100 take place in a well-known manner to place the shaft and wipers on a vertical level corresponding to the number of pulses in the first digit received by the switch. Depending on the digit selected and the arrangement of the cam lugs for that digit one of the following will occur. (*a*) Neither normal post spring 69 nor 79 will operate when the shaft is at a level, (*b*) normal post spring 69 will operate but normal post spring 79 will not operate at a level, (*c*) normal post spring 79 will operate but normal post spring 69 will not operate at a level, or (*d*) both normal post springs 69 and 79 will operate at a level. By this arrangement the following situations described in detail will occur.

*Automatic trunk hunting after receipt of first digit*

Assume that the cam lugs on the normal post are so adjusted that both normal post springs 69 and 79 are rendered inoperative at the level represented by the digit 0. This digit indicates a level on which the selector 100 will function normally, that is, step in the vertical direction in response to the initial train of impulses and step to the rotary positions automatically until an idle trunk to a succeeding switch is located. At the conclusion of the first train of pulses to the selector 100, relay 40 releases, closing a circuit to the rotary magnet 80 from ground, break contacts 92 and 43, make contact 53, break contact 67, normal post spring 79, break contact 76, normal post spring 69, break contact 74, make contact 32 and through rotary magnet 80 to battery. The rotary magnet 80 operates, rotating the shaft and wipers to the first set of bank contacts whereupon the selector continues to function in a well-known manner to find an idle trunk.

*Absorb one or more digits once only and trunk hunt on all levels after receipt of the next digit*

Next assume that the cam lugs on the normal post are so adjusted that the left normal post spring 69 is operative but the right normal post spring 79 is not operative and this condition is represented by the level corresponding to the digit 3. This indicates a level on which the selector will absorb the digit and thereafter will function normally at all levels. The shaft and wipers are raised vertically by the first train of pulses and normal post spring 69 is operated. At the conclusion of the first train of pulses relay 40 releases closing a circuit to the upper winding of relay 60 and battery from ground, break contacts 92 and 43, make contact 53, break contact 67, normal post spring 79, break contact 76, operated normal post spring 69, and break contact 63. The upper winding of relay 60 in operating closes the "X" contact 62 only.

Operation of normal post spring 69 also connects ground through break contacts 92 and 43, make contact 53, break contact 67, normal post spring 79, break contact 76, operated normal post spring 69, rectifier 68, break contacts 65 and 41, vertical off-normal spring 49, and release magnet 90 to battery. The release magnet is locked operated from ground through make contact 91 and operated VON spring 49. The switch now releases, breaking the normal post spring 69, thus removing ground from the center tap of the windings of relay 60 and thereby removing the short circuit from its lower winding. Relay 60 now locks itself to ground from make contacts 52 and 62, through both windings to + battery and now fully operates, opening the original operating circuit to the upper winding at contact 63. This prevents the lower winding of relay 60 from being subsequently shunted out by operation of normal post spring 69. Break contact 67 opens the original release magnet circuit and make contact 66 prepares a circuit for the rotary magnet 80 extending from ground through break contacts 92 and 43, make contact 53, break contact 74 and make contact 32 bypassing the normal post springs 69 and 79, but when VON spring 39 opens, relay 30 releases, and prevents the rotary magnet 80 from operating by opening its circuit at break contact 32.

Ground is connected through the VON spring 49 and release magnet 90 through make contact 91 to assure an alarm should the shaft fail to release completely after normal post spring 69 had broken the operating ground to the release magnet 90. The release magnet 90 would have been energized, but VON spring 49 might have failed to open due to mechanical failure of the switch.

Rectifier 68 is utilized to prevent ground from operating the upper winding of relay 60 in a situation where the normal post spring 79 is operated without being preceded by operation of normal post spring 69. Without rectifier 68, ground would operate relay 60 through make contact 91, break contacts 41, 65, and 63, to negative battery on operation of the release magnet subsequent to deenergization of relay 70.

The next digit received by the switch will raise the shaft and wipers to its corresponding level whereupon they will rotate to the first set of bank contacts and continue to trunk hunt in a well-known manner.

*Repeated digit absorbing*

Now assume that the first digit received by the switch raises the shaft and wipers to a level which will operate right normal post spring 79 but not left normal post spring 69 and that this digit corresponds to level 5. At any level when this arrangement occurs the digit corresponding to that level will be absorbed and will continue to be absorbed in any sequence it is received unless it is preceded by a digit such as 3, which operates only left normal post spring 69. Right normal post spring 79 is operated at the completion of vertical stepping of the shaft and wipers. Simultaneously relay 40 releases, closing a ground circuit to the upper winding of relay 70 from break contacts 92 and 43, make contact 53, break contact 67, operated normal post spring 79, through the upper winding of relay 70 to battery. Relay 70 operates, preparing a locking circuit to its lower winding, which is ineffective until relay 60 is operated, through make contact 71. Ground through make contact 73, break contacts 65 and 41, and VON spring 49 operates the release magnet 90 that releases the shaft and wipers which return to normal position. Any digit that raises the shaft and wipers to a level which operates right normal post spring 79 but not left normal post spring 69 subsequent to the digit 5 as just described, will effect a release of the shaft and wipers to normal in a similar manner.

If the digit five, just described, were preceded by a digit such as 3 which operated only the left normal post spring 69, then relay 60 would be operated and locked as hereinbefore described and ground would be prevented from reaching right normal post spring 79 by the opening of contact 67. Relay 70 would therefore be inoperative and the switch would not release as heretofore described. The switch will now rotate in search of an idle trunk in a well-known manner.

*Prevent access of level and return tone or voice to calling party if improper sequence is dialled*

Next assume that the digit received by the switch operates both the normal post springs 69 and 79 when the shaft is stepped vertically to its position and it corresponds to level 8. At this level or a similar level the switch will not trunk in but will release the shaft and wipers and report by busy tone, voice message, or similar notice to the calling party to indicate that the proper unlocking digit similar to 3 as described above did not precede the present digit. This means that the digits were either dialled out of sequence or otherwise transposed so as not to include an unlocking digit which would operate left normal post spring 69 but not right normal post spring 79 immediately preceding digit 8 and therefore the shaft and wipers are now on the wrong level. This result is accomplished when relay 40 releases after receipt of the first series of pulses. Ground is connected from break contacts 92 and 43, make contact 53, break contact 67, operated normal post spring 79, through the upper winding of relay 70 to battery. Relay 70 operates to prepare a locking circuit to its lower winding at make contact 71 and also places ground on the operated normal post spring 69 at make contact 75. That ground goes through break contact 63, and the upper winding of relay 60 to battery and operates relay 60 only to make contact 62. Ground through make contacts 52 and 62 and both windings of relay 60 to battery hold relay 60 operated to make contact 62 only since the lower winding is still shunted out. Relay 70 is held operated through its lower winding from make contacts 52, 62 and 71 to battery. Ground is extended to voice or tone start through rectifier 78.

The shaft now releases due to energization of the release magnet 90 from ground at make contact 73, break contacts 65 and 41, through the operated vertical off-normal springs 49 to the release magnet 90, and battery.

The normal post springs 69 and 79 restore when the shaft returns to normal, opening the path to the upper winding of relay 70, but it is held operated by its lower winding. VON spring 49 opens the path to the release magnet 90 causing it to restore. Spring 69 opens the path to the upper winding of relay 60 thus removing the shunt from its lower winding and allowing relay 60 to fully operate.

Busy tone or a voice recording repeating "you have dialled a wrong number, please check your directory and dial properly," will be returned to the calling party through a circuit from the tone or voice mechanism, make contacts 72 and 61, the primary winding of induction coil 21 to batery. The signal will be sent over the line through the secondary winding of induction coil 21.

Unless the digit 8, which raised the shaft and wipers to a level which operated normal post springs 69 and 79, is preceded by the digit 3, which locates the shaft at a level which operates only normal post spring 69, the shaft and wipers will always release and the calling party be notified as hereinbefore described. Had the preceding digit been a 3, which raised the shaft and wipers to a level which operated only normal post spring 69, then relay 60 would be operated and make contact 67 would open the ground circuit to relay 70 and transfer it to the rotary magnet 80 through break contact 74 and make contact 32 notwithstanding the operation of both normal post springs 69 and 79. Now at the completion of digit 8 instead of releasing, the shaft will rotate the wipers in search for an idle connector in the normal manner.

*Prevent access of level and return tone or voice to calling party on vacant levels*

It may be desirable to prevent access to a level under all circumstances because it is vacant, restricted or for other reasons. To obtain this result the wiring indicated by the broken lines must be used. Assume that digit 8 also represents this level.

As in the previous example when the shaft and wipers were on level 8 both normal post spring 69 and 79 were operated, but the level was accessible if preceded by a digit 3 which operated relay 60 to open a circuit to relay 70 and close a circuit to rotary magnet 80. The wiring indicated by broken lines in the drawing must be added to the circuit to effectuate this alternate condition if vacant or restricted levels are to be recognized. If digit 8 is now dialled without being preceded by digit 3, the shaft and wipers will release and busy tone or voice will be returned to the calling subscriber as hereinbefore described. If digit 8 is dialled subsequent to digit 3, instead of rotating in on level 8, the shaft will remain in its vertical position at level 8 and busy tone or voice will be returned to the calling subscriber to indicate that he has dialled a wrong digit. Relay 60 locked up when the previous service of pulses raised the shaft to level 3. Relay 70 now operates from ground through break contacts 92 and 43, make contacts 53 and 66, rectifier 77, operated normal post spring 69, rectifier 68, make contact 64, operated normal post spring 79, the upper winding of relay 70 to battery. Busy tone or voice is sent to the calling subscriber through a circuit from the voice or tone mechanism, make contacts 72 and 61, the primary winding of induction coil 21 to battery. The signal is returned to the calling subscriber over the line by the secondary winding of induction coil 21. Rotary movement is prevented by the circuit opening at contact 74 and the shaft and wipers remain in this position until the calling subscriber replaces his handset.

It is to be understood that if no levels are vacant or restricted the additional wiring indicated by the broken lines is not required and the alternate condition of allowing access to a heretofore non-accessible level will prevail if the proper digit or digits precede it.

Although I have cited specific conditions to more clearly describe the invention, it is understood that various modifications not limited to these conditions may be made within the true scope and spirit of my invention.

What I claim is:

1. In a two-motion step-by-step selector switch comprising means controlled over a calling line for stepping the switch wipers to a desired level in a multilevel terminal bank and means for advancing the wipers on the selected level to hunt for a set of terminals connected to an idle trunk, two sets of normal post springs each independently operable on one or more levels, said two sets of normal springs operated responsive to stepping said wipers to a particular level, a first relay operated responsive to the operation of the first of said normal post springs, a release magnet operated in response to the operation of said first relay for restoring said wipers to normal, a second relay operated in response to the operation of said second normal post spring and the operation of said release magnet, and a circuit closed by the operation of both of said relays for connecting a voice announcing means externally through said selector to said calling line to notify the calling subscriber that the connection cannot be completed.

2. In a two-motion step-by-step group selector switch comprising means controlled over a calling line for stepping the switch wipers to a desired level in a multilevel terminal bank and means for advancing the wipers on the selected level to hunt for a set of terminals connected to an idle trunk, two sets of normal post springs each independently operable on one or more levels, both of said normal post springs operated responsive to stepping said wipers to a particular level, a first relay operated responsive to the operation of the first of said normal post springs for preventing the hunting on said particular level, a second relay partially operated over a circuit controlled by said operated second normal post spring and full operated over a circuit prepared by said partial operation, and a circuit closed by the complete operation of said relays for connecting a voice announcing means externally through said selector switch to said calling line to notify the calling subscriber that the connection cannot be completed.

3. In a digit absorbing selector switch the combination of a first set of normal post springs independently operable on any or all levels, cam means for actuating said first set of normal post springs, means including a release magnet for returning the switch wipers to normal and allowing trunk hunting on all levels subsequent to the next series of impulses after vertical stepping to a level on which said first set of normal post springs is actuated, a second set of normal post springs independently operable on any or all levels, cam means for actuating said second set of normal post springs, said releasing means returning said switch wipers to normal after vertical stepping to a level on which said second set of normal post springs is actuated except when preceded by a series of impulses which steps said switch wipers to a level on which only said first set of normal post springs is actuated, a first relay operated responsive to the operation of said first normal post springs, a second relay operated in response to the operation of said second normal post spring and the operation of said release magnet and both of said relays for connecting a voice answering means externally through said digit absorbing selector to notify the calling subscriber that the connection cannot be extended, said releasing means effective when said switch wipers are stepped to a level on which both of said sets of normal post springs are actuated simultaneously before being stepped to a level on which only said first set of normal post springs are actuated.

4. In a digit absorbing selector switch the combination of a first set of normal post springs independently operable on any or all levels, cam means for actuating said first set of normal post springs, means including a release magnet for returning the switch wipers to normal and allowing trunk hunting on all levels subsequent to the next series of impulses after vertical stepping to a level on which said first set of normal post springs is actuated, a second set of normal post springs independently operable on any or all levels, cam means for actuating said second set of normal post springs, releasing means for returning said switch wipers to normal after vertical stepping to a level on which said second set of normal post springs is actuated except when preceded by a series of impulses which steps said switch wipers to a level on which only said first set of normal post springs is actuated, a first relay operated responsive to the operation of the first of said normal post springs, a second relay operated in response to the operation of said second normal post spring and the operation of both of said relays for connecting a voice announcing means externally through said selector switch to notify the calling subscriber that the connection cannot be completed, said first and second relays effective subsequent to the stepping of the switch wipers to a level on which both of said sets of normal post springs are actuated simultaneously.

5. In a telephone system, a digit absorbing selector switch comprising means controlled over a calling line for stepping the switch wipers to a desired level in a multilevel terminal bank, means for advancing the wipers on the selected level to hunt for a set of terminals connected to an idle trunk, an announcing means controlled by said switch, two sets of normal post springs each independently operable on one or more levels of said switch, both sets of normal post springs operated simultaneously on a particular level, means responsive to both of said normal springs operating simultaneously upon the wipers being stepped to said particular level for preventing access to said particular level and initiate the operation of said announcing means to notify the calling party that the connection cannot be completed, and means for permitting advancement of said wipers on said particular level upon one of said normal post springs being operated responsive to being stepped to a level for the independent operation and release thereof followed by the stepping of said wipers to said particular level.

6. In a telephone system, a digit absorbing selector switch comprising means controlled over a calling line upon receipt of digital impulses for stepping the switch wipers to a desired level in a multilevel terminal bank, means for advancing the wipers on the selected level to hunt for a set of terminals connected to an idle trunk, a voice announcing means controlled by said switch, two sets of normal post springs each independently operable on one or more levels of said switch, said two sets of normal post springs operated simultaneously on a particular level, a first relay operated responsive to the operation of the first of said normal post springs, releasing means operated in response to the operation of said first normal post spring for restoring said wipers to normal and absorbing the digital series dialled, a second relay operated responsive to the operation of the second of said normal post springs, said releasing means operated in response to the operation of said second relay for restoring said wipers to normal and absorbing the digital series dialled, said second relay operated and said first relay partially operated responsive to the simultaneous operations of said first and second normal post springs to restore said wipers to normal and connect said voice announcing means to said calling line to notify the calling subscriber that the call cannot be completed.

7. In a telephone system, a digit absorbing selector switch comprising means controlled over a calling line upon receipt of digital impulses for stepping the switch wipers to a desired level in a multilevel terminal bank, means for advancing the wipers on the selected level to hunt for a set of terminals connected to an idle trunk, a voice announcing means controlled by said switch, a first and second set of normal post springs each independently operable on one or more levels of said switch, said first and second sets of normal post springs operated simultaneously on a particular level, said first set of normal post springs operated responsive to said wipers being stepped to a first certain level upon receipt of a series of digital impulses corresponding thereto, said second set of normal springs operated responsive to said wipers being stepped to a second certain level upon receipt of a series of digital impulses corresponding thereto, a first relay operated responsive to the operation of said first set of normal post springs and a release magnet operated thereby to restore said wipers to normal to absorb the digital impulse series, a second relay operated responsive to the operation of said second set of normal post springs which in turn operates said release magnet to restore said wipers to normal to absorb the digital impulse series, said second relay operated and said first relay partially operated responsive to the simultaneous operation of said first and second sets of normal post springs upon said wipers being stepped to said particular level responsive to receipt of digital impulses corresponding thereto, said releasing means restoring said wipers to normal responsive to the operation of said second relay which in turn opens said first and second normal post springs, the opening of said first normal post springs causing said first relay to operate completely to connect said voice announcing means to said calling party to notify the subscriber that the call cannot be completed.

References Cited in the file of this patent

UNITED STATES PATENTS

| | | |
|---|---|---|
| 2,170,885 | Wright | Aug. 29, 1939 |
| 2,642,498 | Riddell et al. | June 16, 1953 |
| 2,658,949 | Pharis | Nov. 10, 1953 |